US009696485B2

(12) United States Patent
Mao et al.

(10) Patent No.: US 9,696,485 B2
(45) Date of Patent: Jul. 4, 2017

(54) OPTICAL CIRCULATOR ARRAY

(71) Applicant: Oplink Communications, LLC, Fremont, CA (US)

(72) Inventors: Hongwei Mao, Fremont, CA (US); Zhongsheng Wang, Fremont, CA (US); Guijun Ji, Cupertino, CA (US); Jinyuan Qiao, Cupertino, CA (US); Tian Zhu, Castro Valley, CA (US); Lifu Gong, San Jose, CA (US)

(73) Assignee: Oplink Communications, LLC, Fremont, CA (US)

( * ) Notice: Subject to any disclaimer, the term of this patent is extended or adjusted under 35 U.S.C. 154(b) by 59 days.

(21) Appl. No.: 14/333,230

(22) Filed: Jul. 16, 2014

(65) Prior Publication Data
US 2016/0018594 A1    Jan. 21, 2016

(51) Int. Cl.
G02B 6/10 (2006.01)
G02F 1/09 (2006.01)
G02B 27/28 (2006.01)
G02B 6/27 (2006.01)
G02B 6/32 (2006.01)

(52) U.S. Cl.
CPC .......... G02B 6/105 (2013.01); G02B 6/2746 (2013.01); G02B 27/285 (2013.01); G02F 1/093 (2013.01); G02B 6/32 (2013.01); G02F 2201/18 (2013.01); G02F 2203/06 (2013.01)

(58) Field of Classification Search
CPC .... G02B 6/2746; G02B 6/2932; G02B 6/105; G02B 6/32; G02B 27/285; G02F 1/093; G02F 2201/18; G02F 2203/06
See application file for complete search history.

(56) References Cited

U.S. PATENT DOCUMENTS

| 5,204,771 A * | 4/1993 | Koga ................. G02B 5/3083 359/281 |
| 5,909,310 A | 6/1999 | Li et al. |
| 6,049,426 A * | 4/2000 | Xie ....................... G02B 6/272 359/484.05 |
| 6,064,522 A | 5/2000 | Bergmann et al. |
| 6,246,807 B1 | 6/2001 | Lu et al. |
| 6,285,499 B1 | 9/2001 | Xie et al. |
| 6,563,982 B1 | 5/2003 | Xie et al. |
| 6,741,764 B2 * | 5/2004 | Wu ..................... G02B 6/2706 359/489.09 |

(Continued)

*Primary Examiner* — Daniel Petkovsek
(74) *Attorney, Agent, or Firm* — Jeffrey K. Jacobs

(57) ABSTRACT

Methods, systems, and apparatus, including computer programs encoded on a computer storage medium, for optical communications. In one aspect, an optical circulator array includes a plurality of stacked three port circulators each having a respective first port of a first port array, a respective second port of a second port array, and a respective third port of a third port array, wherein each of the plurality of stacked three port circulators share optical components including: a first Wollaston prism coupled to the first port array, a first lens, a first half wave plate, a polarization dependent beam path separator, a second half wave plate, a second lens, a propagation direction dependent polarization rotation assembly, a second Wollaston prism coupled to the second port array, and a third Wollaston prism coupled to the third port array.

15 Claims, 4 Drawing Sheets

(56) References Cited

U.S. PATENT DOCUMENTS

| | | | |
|---|---|---|---|
| 6,757,451 B2* | 6/2004 | Chang | G02B 6/272 |
| | | | 359/484.05 |
| 6,895,129 B2 | 5/2005 | Liu et al. | |
| 2002/0024729 A1* | 2/2002 | Xie | G02B 5/3083 |
| | | | 359/484.05 |
| 2002/0168128 A1* | 11/2002 | Chang | G02B 6/272 |
| | | | 385/11 |
| 2003/0090796 A1 | 5/2003 | Tai et al. | |
| 2003/0147136 A1 | 8/2003 | Pan et al. | |
| 2006/0098205 A1 | 5/2006 | Townley-Smith et al. | |

* cited by examiner

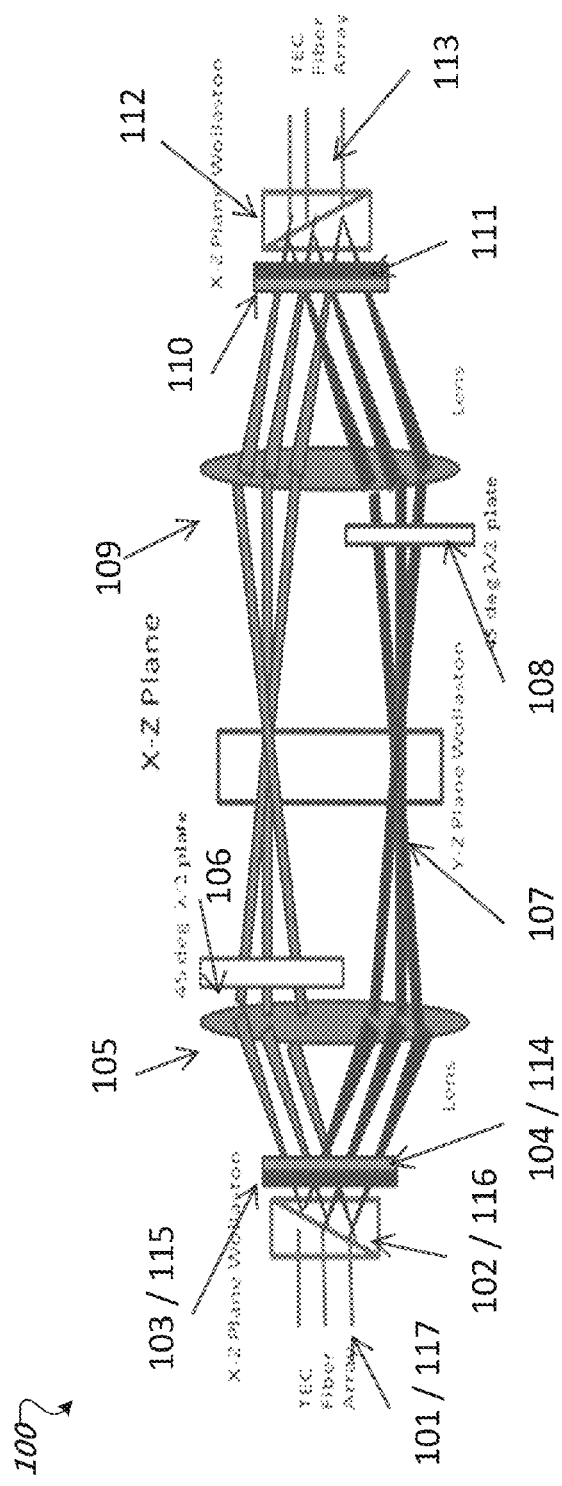
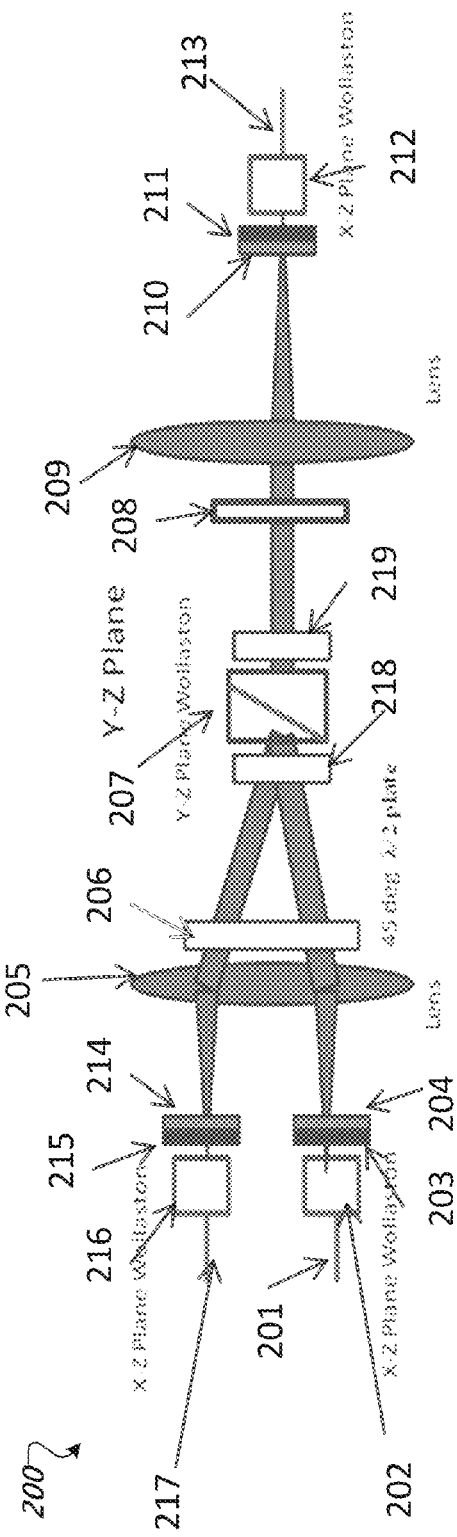
FIG. 1C
FIG. 2A

OPTICAL CIRCULATOR ARRAY

BACKGROUND

This specification relates to optical communications.

Conventional optical circulators are employed in systems transmitting optical signals in order to transmit optical signals in a particular direction. For example, in a three port optical circulator, an optical signal input at the first port will be transmitted to the second port. An optical signal input at the second port will be transmitted to the third port. However, optical signals typically will not be transmitted in the reverse direction. For example, an optical signal input at the second port will not be transmitted to the first port.

SUMMARY

In general, one innovative aspect of the subject matter described in this specification can be embodied in optical circulator arrays that include a plurality of stacked three port circulators each having a respective first port of a first port array, a respective second port of a second port array, and a respective third port of a third port array, wherein each of the plurality of stacked three port circulators share optical components including: a first Wollaston prism coupled to the first port array, a first lens, a first half wave plate, a polarization dependent beam path separator, a second half wave plate, a second lens, a propagation direction dependent polarization rotation assembly, a second Wollaston prism coupled to the second port array, and a third Wollaston prism coupled to the third port array.

The foregoing and other embodiments can each optionally include one or more of the following features, alone or in combination. In particular, one embodiment includes all the following features in combination. The propagation direction dependent polarization rotation assembly includes a Faraday rotator and a half wave plate. Each port array includes one or more thermal expansion core (TEC) fibers. The polarization dependent beam path separator includes a birefringence wedge pair. The birefringence wedge pair includes: a first wedge optically coupled to a first side of the birefringence wedge pair; and a second wedge optically coupled to a second side of the birefringence wedge pair, wherein the first wedge and the second wedge correct parallelization of light beams passing through the optical circulator array. The polarization dependent beam path separator includes an optical beam separator with polarization dependent coating. The TEC fibers, first lens, second lens, and polarization dependent beam path separator are positioned in a double telemetric configuration layout. The polarization dependent beam path separator provides beam path routing from the first port to the second port and from the second port to the third port based on a polarization orientation of incident light beams. The polarization dependent beam path separator is optically coupled between the first lens and the second lens. The propagation direction dependent polarization rotation assembly is optically coupled between the second Wollaston prism and the second lens.

The optical circulator array further includes a second propagation direction dependent polarization rotation assembly coupled to the first port; and a third propagation direction dependent polarization rotation assembly coupled to the third port, wherein the second propagation direction dependent polarization rotation assembly is optically coupled between the first Wollaston prism and the first lens, and the third propagation direction dependent polarization rotation assembly is optically coupled between the third Wollaston prism and the first lens. The second propagation direction dependent polarization rotation assembly provides isolation to reduce light leakage along a path from the second port to the first port. The third propagation direction dependent polarization rotation assembly provides isolation to reduce light leakage along a path from the third port to the second port. Light beams input at the first port are randomly polarized and wherein the first Wollaston prism and the first half wave plate provide polarization conditioning.

In general, one innovative aspect of the subject matter described in this specification can be embodied in optical circulator arrays that include a plurality of stacked three port circulators each having a respective first port of a first port array, a respective second port of a second port array, and a respective third port of a third port array, wherein each of the plurality of stacked three port circulators share optical components including: a first micro lens array optically coupled to the first port array and the third port array, a first walk off crystal, a first half wave plate, a first faraday rotator, a first birefringence wedge pair, a second birefringence wedge pair, a second Faraday rotator, a second half wave plate, a second birefringence walk off crystal, and a second micro lens array optically coupled to the second port array.

Particular embodiments of the subject matter described in this specification can be implemented so as to realize one or more of the following advantages. An optical circulator array allows multiple three port circulators to be stacked so that they each use a common set of optical components. The array of circulators can be aligned substantially concurrently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1C is a diagram of the example optical circulator array of FIG. 1A on an array stacking and polarization conditioning X-Z plane.

FIG. 2A is a diagram of an example optical circulator array on a port beams routing Y-Z plane.

Like reference numbers and designations in the various drawings indicate like elements.

DETAILED DESCRIPTION

Figure 1A:
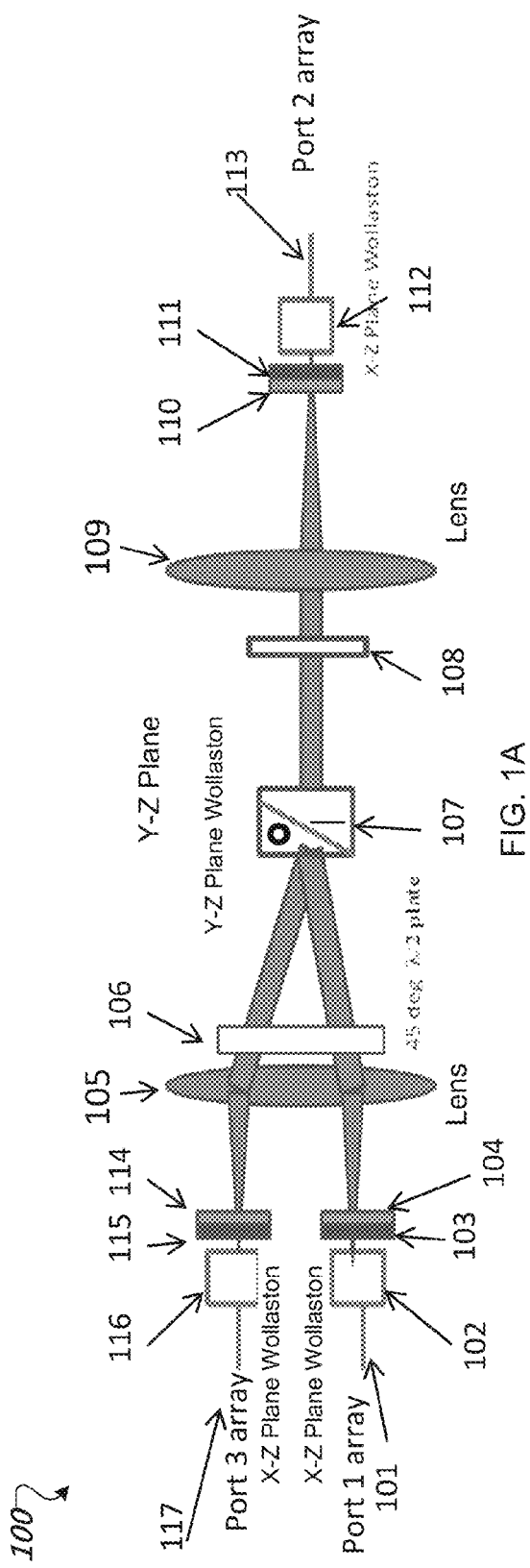
FIG. 1A is a diagram of an example optical circulator array on a port beams routing Y-Z plane.
Figure 1B:
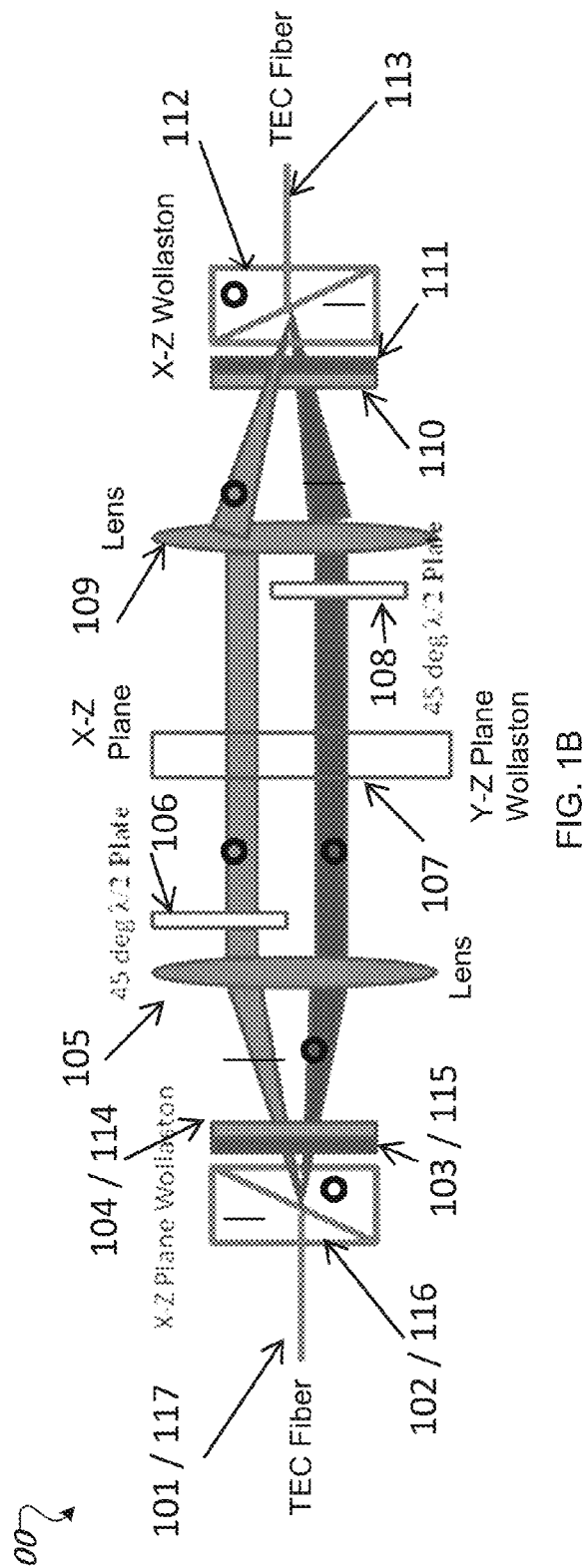
FIG. 1B is a diagram of an example single optical circulator of the optical circulator array of FIG. 1A on a polarization conditioning X-Z plane.

FIGS. 1A-C illustrate an example optical circulator array 100. FIG. 1A is a diagram of the example optical circulator array 100 on a port beams routing Y-Z plane. FIG. 1B is a diagram of an example single optical circulator of the optical circulator array 100 of FIG. 1A on a polarization conditioning X-Z plane. FIG. 1C is a diagram of the example optical circulator array 100 of FIG. 1A on an array stacking and polarization conditioning X-Z plane showing light paths for multiple circulators of the optical circulator array 100.

The optical circulator array 100 includes a first port array 101, a second port array 113, and a third port array 117. The optical circulator array 100 is configured such that an input beam from an optical fiber at the first port array 101 is routed to an output optical fiber at the second port array 113 and that an input beam from an optical fiber at the second port array 113 is routed to an output fiber at the third port array 117. The optical circulator array 100 provides an array of multiple three port optical circulators stacked on the X-Z plane. Each optical circulator of the array shares the optical ports and optical components. The optical circulators of the array can be aligned at the same time.

FIG. 1A shows beam paths for an optical input from the first port array 101 to output at the second port array 113 and an optical input from the second port array 113 to output at the third port array 117.

Each of the first port array 101, second port array 113 and third port array 117 can include or be coupled to one or more thermal expansion core (TEC) fiber that allows multiple optical signals to be input and output from the respective port arrays of the optical circulator array 100. A TEC fiber has an enlarged mode field diameter obtained through heating relative to a typical single mode optical fiber.

With reference to FIG. 1A, a light beam input at the first port array 101 through a corresponding TEC fiber has a random polarization. The input beam passes through a first Wollaston prism 102. The first Wollaston prism 102 includes a pair of wedge prisms. The optic axes of the wedge prisms are perpendicular to each other such that the light beam exiting the Wollaston prism 102 diverges based on polarization direction such that two orthogonally polarized light beams result. After the TEC fiber the Gaussian beam divergence angle is reduced that allows two orthogonally polarized light beams to be clearly separated angularly by Wollaston prism 102. A C-axis of the first wedge prism of the Wollaston prism 102 is parallel to the X-Z plane and the C-axis of the second wedge prism of the Wollaston prism 102 is perpendicular to the X-Z plane.

The light beams exiting the Wollaston prism 102 then pass through a first propagation direction dependent polarization rotation assembly. The first propagation direction dependent polarization rotation assembly includes a first 45 degree Faraday rotator 103 and a first 22.5 degree cut half wave plate 104. In the propagation direction from the first port array 101 to the second port array 113, the first propagation direction dependent polarization rotation assembly provides zero degrees of polarization rotation. The light beams then pass through a first lens 105, which collimates the light beams so that they are substantially parallel.

As shown in FIG. 1B illustrating beam paths for a single optical circulator along the X-Z plane, one of the two orthogonally polarized light beams that is polarized parallel to the X-Z plane passes through a 45 degree cut half wave plate 106 such that its polarization is rotated by 90 degrees to the direction that is perpendicular to the X-Z plane. The light beam exiting the 45 degree cut half wave plate 106 is directed to a Y-Z plane birefringence wedge pair or Wollaston prism 107.

The other orthogonally polarized light beam is polarized perpendicular to the X-Z plane is directly passed to the Y-Z plane birefringence wedge pair 107, which may be another Wollaston prism. Consequently, the two light beams have the same polarization direction upon entering the Y-Z plane birefringence wedge pair or Wollaston prism 107.

The Y-Z plane birefringence wedge pair or Wollaston prism 107 is configured such that it passes the light beams having the same polarization direction that is perpendicular to the X-Z plane from a beam path corresponding to the first port array 101 to a beam path toward the second port array 113. The light beam that corresponds to the bream that passed directly from the first lens 105 to the Y-Z plane birefringence wedge pair or Wollaston prism 107 is then passed through a 45 degree cut half wave plate 108 resulting in a polarization rotation of 90 degrees to the direction that is parallel to the X-Z plane. The light beam exiting the 45 degree cut half wave plate 108 is directed to a second lens 109.

The other light beam, which passed through the 45 degree cut half wave plate 106, is directly coupled to the second lens 109 without passing through the 45 degree cut half wave plate 108. Therefore, the light beam remains polarized in the direction perpendicular to the X-Z plane as it is coupled to the second lens 109.

The Y-Z plane birefringence wedge pair 107 includes two crystal wedges having orthogonal axes to each other. The C-axis of the first wedge of the Y-Z plane birefringence wedge pair 107 is perpendicular to the Y-Z plane and the C-axis of the second wedge of the Y-Z plane birefringence wedge pair 107 is parallel to the Y-Z plane.

After the light beams pass through the second lens 109, the light beams are coupled to a second propagation direction dependent polarization rotation assembly. The second propagation direction dependent polarization rotation assembly includes a second 45 degree Faraday rotator 111 and a second 22.5 degree cut half wave plate 110. In the propagation direction from the first port array 101 to the second port array 113, the second propagation direction dependent polarization rotation assembly provides zero degrees of polarization rotation.

After passing through the second propagation direction dependent polarization rotation assembly, the light beams are coupled to a second Wollaston prism 112. The second Wollaston prism 112 includes a pair of wedge prisms. The C-axis of the first wedge of the second Wollaston prism 112 is parallel to X-Z plane and the C-axis of the second wedge of the second Wollaston prism 112 is perpendicular to X-Z plane. Upon exiting the second Wollaston prism 112, the light beams are recombined into a single light beam, which is focused into a TEC fiber of the second output port array 113.

A light beam input at the second port array 113 follows an optical path through the optical circulator array 100 to be output by an optical fiber at the third port array 117. A light beam input at the second port array 113 passes through the second Wollaston prism 112, which causes the light beam to diverge into two orthogonally polarized light beams. After the TEC fiber the Gaussian beam divergence angle is reduced, which allows two orthogonally polarized light beams to be clearly separated angularly by Wollaston prism 112. The light beams pass through the second propagation direction dependent polarization rotation assembly in the opposite direction to the propagation path from the first port array 101 to the second port array 113. As a result, the second 45 degree Faraday rotator 111 and a second 22.5 degree cut half wave plate 110 provide a 90 degree polarization rotation in combination. However, both light beams remain orthogonally polarized with respect to each other.

Upon passing through the lens 109 a first orthogonal beam polarized parallel to the X-Z plane passes directly to the birefringence wedge pair 107 while the second orthogonal beam passes through the 45 degree cut half wave plate 108 resulting in a polarization rotation of 90 degrees before passing through the birefringence wedge pair 107. Thus, upon entering the birefringence wedge pair 107, both light beams have the same polarization direction, which is parallel to the X-Z plane. As a result, the birefringence wedge pair or port beam routing Wollaston Prism 107 directs the light beams along a beam path toward the third port array 117.

The lens 105 focuses the light beams to a third propagation direction dependent polarization rotation assembly. The third propagation direction dependent polarization rotation assembly includes a third 22.5 degree cut half wave plate 114 and a third 45 degree Faraday rotator 115. In the propagation direction from the second port array 113 to the third port array 117, the third 22.5 degree cut half wave plate 114 and the third 45 degree Faraday rotator 115 provide a 90 degree polarization rotation in combination to each respective light beam.

The light beams exiting the third propagation direction dependent polarization rotation assembly then enter a third Wollaston prism 116. Upon exiting the third Wollaston prism 116, the light beams are recombined into a single light beam, which is focused into a particular TEC fiber of the third output port array 117.

Thus, the light beams are routed onto the path to the third port array 117 after the Y-Z birefringence wedge pair 107. The arrangements of polarization rotation components including half wave plate 108, half wave plate 106, half wave plate 114 and half wave plate 115 are configured that two beam components separated by the second Wollaston prism 112 when input from the second port array 113 can be recombined in the third Wollaston prism 116.

Leakage of light in a reverse path of the circulator array 100 from the second port array 113 to the first port array 101 can be further isolated by the combination of the first 45 degree Faraday rotator 103 and the first 22.5 degree cut half wave plate 104. In the light propagation direction of from the second port array 113 to the first port array 101, the combination of the first 45 degree Faraday rotator 103 and the first 22.5 degree cut half wave plate 104 will provide 90 degree polarization rotation such that the leakage light, which has a polarization perpendicular to X-Z plane, cannot be recombined by the first Wollaston prism 102 and thereby cannot be directed to an optical fiber of the first port array 101. Light leakage from the third port array 117 to the second port array 113 can be similarly isolated.

FIG. 1C illustrates an array of three port optical circulators on the X-Z plane. In particular, the components described above, particularly the layout of the input TEC fibers, first lens 105, birefringence wedge pair 107, second lens 109, and output TEC fibers are arranged in a double telemetric configuration layout.

In a double telemetric configuration layout, the one or more TEC fibers of the first port array 101 and the third port array 117 are located at a rear focal plane of the first lens 105. The birefringence wedge pair 107 for port beam path routing is located at the front focal plane of the first lens 105 and at the rear focal plane of the second lens 109. Similarly, the one or more TEC fibers of the second port array 113 are located at a front focal plane of the second lens 109.

Because of the optical features provided by the double telemetric configuration: the input beams from the TEC fibers at the first port array 101 TEC fibers can be collimated by the first lens 105; the light beams crossing at the birefringence wedge pair 107 can also be refocused by the second lens 109 to the TEC fibers of the second port array 113 with a same incident angle; and the light beams input from a top TEC fiber of the first port array 101 is imaged onto a bottom output TEC fiber of the second port array 113. Similarly, the input beams from the TEC fibers of the second port array 113 can be collimated by the second lens 109; the light beams crossing at the birefringence wedge pair 107 can also be refocused by the first lens 105 onto the TEC fibers of the third port array 117 with a same incident angle; and the light beams input from a top TEC fiber of the second port array 113 is imaged onto a bottom output TEC fiber of the third port array 117. For each of the output ports, all the receiving TEC fibers are at the same focusing plane of the lens and the incoming light beams are of the same incidence angle, so all the circulators in the array can be aligned simultaneously.

Figure 2B:
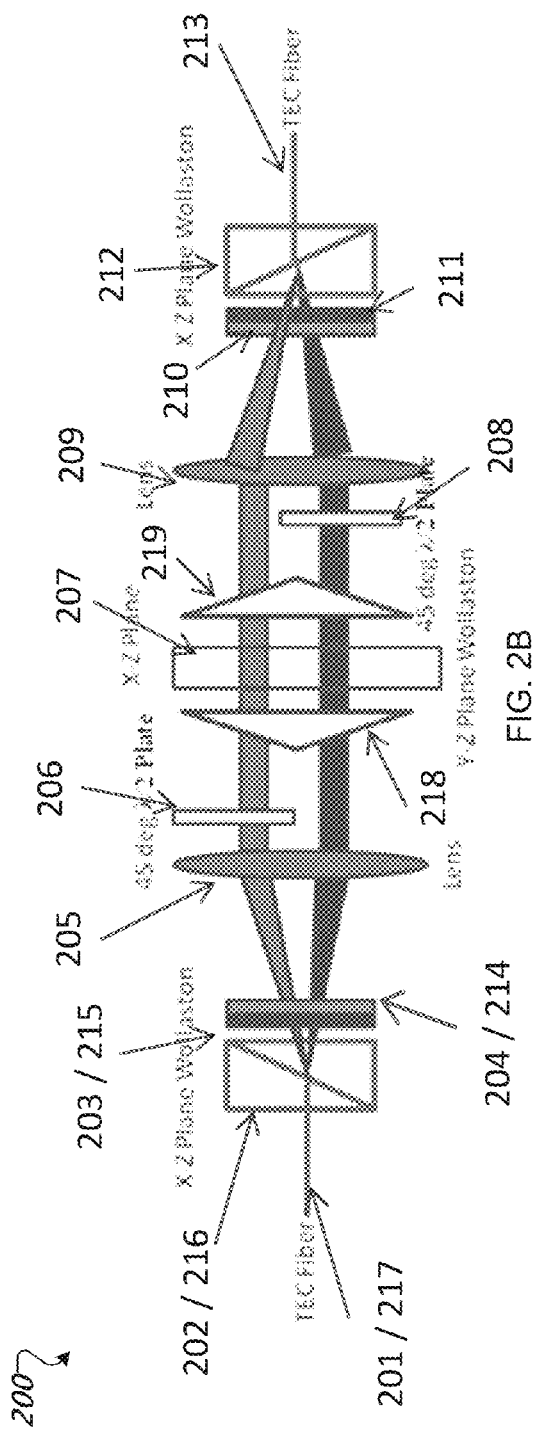
FIG. 2B is a diagram of an example single optical circulator of the optical circulator array of FIG. 2A on a polarization conditioning X-Z plane.
Figure 2C:
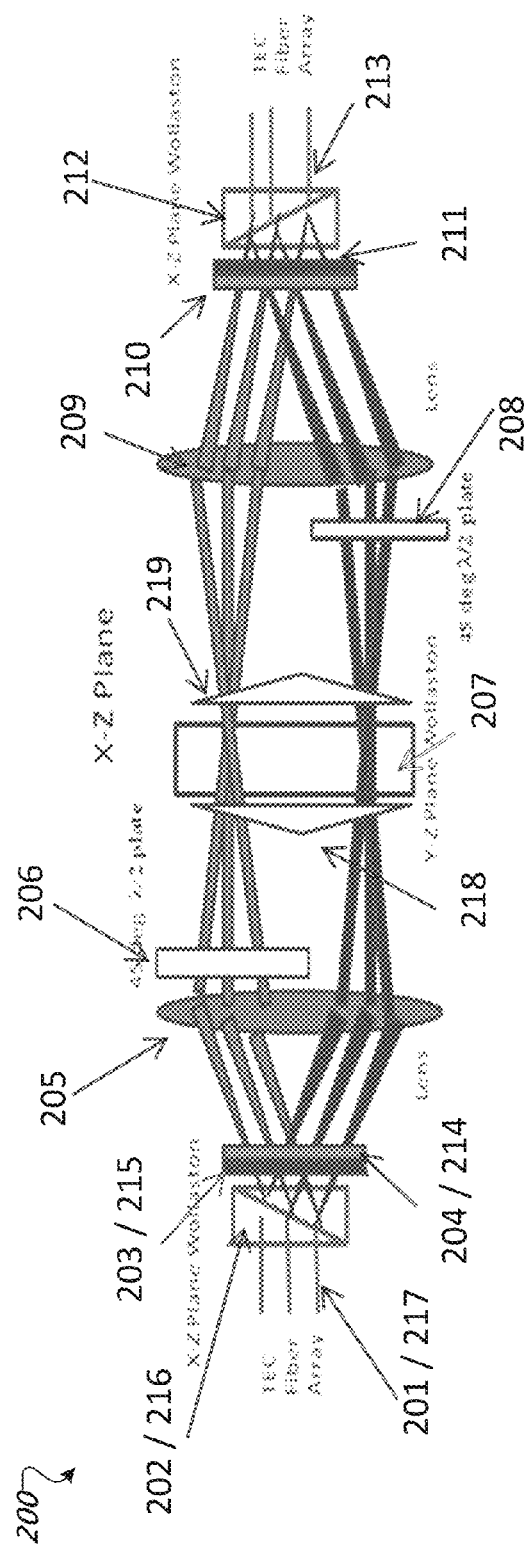
FIG. 2C is a diagram of the example optical circulator array of FIG. 2A on an array stacking and polarization conditioning X-Z plane.

FIGS. 2A-C illustrate an example optical circulator array 200 FIG. 2A is a diagram of the example optical circulator array 200 on a port beam routing Y-Z plane. FIG. 2B is a diagram of an example single optical circulator of the optical circulator array 200 of FIG. 2A on a polarization conditioning X-Z plane. FIG. 2C is a diagram of the example optical circulator array 200 of FIG. 2A on an array stacking and polarization conditioning X-Z plane which illustrates light paths for multiple circulators of the optical circulator array 200.

The optical circulator array 200 includes a first port array 201, a second port array 213, and a third port array 217. The optical circulator array 200 is configured such that an input beam from an optical fiber at the first port array 201 is routed to an output optical fiber at the second port array 213 and that an input beam from an optical fiber at the second port array 213 is routed to an output optical fiber at the third port array 217. The optical circulator array 200 provides an array of multiple three port optical circulators stacked on the X-Z plane. Each optical circulator of the array shares the optical ports and optical components. The optical circulators of the array can be aligned at the same time.

The optical circulator array 200 has a similar structure to the optical circulator array 100 of FIGS. 1A-C. In particular, the optical circulator array 200 includes optical components in a similar configuration including one or more TEC fibers at each port array, and from a propagation direction from the first input port array 201, a first Wollaston prism 202, a first propagation direction dependent polarization rotation assembly that includes a first 45 degree Faraday rotator 203 and a first 22.5 degree cut half wave plate 204, a first lens 205, a 45 degree cut half wave plate 206, a birefringence wedge pair 207, a 45 degree cut half wave plate 208, a second lens 209, a second propagation direction dependent polarization rotation assembly that includes a second 45 degree Faraday rotator 211 and a second 22.5 degree cut half wave plate 210, and a second Wollaston prism 212. Light exiting the second Wollaston prism 212 passes through the second port array 213.

In the direction of propagation of light beams from the second port array 113 to the third port array 117, following the first lens 205, the circulator array 200 includes a third propagation direction dependent polarization rotation assembly and a third Wollaston prism 216. The third propagation direction dependent polarization rotation assembly includes a third 22.5 degree cut half wave plate 214 and a third 45 degree Faraday rotator 215. Light exiting the third Wollaston prism 216 passes through the third port array 217.

Light beams input at the first port array 202 follow beam paths to the second port array 213 through the above components in a similar manner as described above with respect to FIGS. 1 A-C. Similarly, light beams input at the second port array 213 follow beam paths to the third port array 217 in a similar manner as described above with respect to FIG. 1 A-C.

The optical circulator array 200 differs from the structure of the optical circulator array 100 in the addition of optical X-Z plane wedge components 218 and 219. The optical X-Z plane wedge component 218 is positioned on a first side of the birefringence wedge pair 207 facing the first lens 205. The optical X-Z plane wedge component 219 is positioned on a second side of the birefringence wedge pair 207 facing the second lens 209. The purpose of adding the optical X-Z plane wedge components 218 and 219 is to correct beam parallelisms. In particular, because of the physical size and arrangement of the components in the circulator array 200, the polarization beam separation optics, e.g., first Wollaston prism 202, second Wollaston prism 212, and third Wollaston prism 216, cannot be exactly located at the focal planes of the first lens 205 or the second lens 209. On the X-Z plane as shown in FIGS. 2B and 2C, the separated polarized beams cannot be collimated to two exactly parallel beams after the collimating lenses 205/209 without the additional correction provided by the wedge components 218 and 219.

Figure 3A:
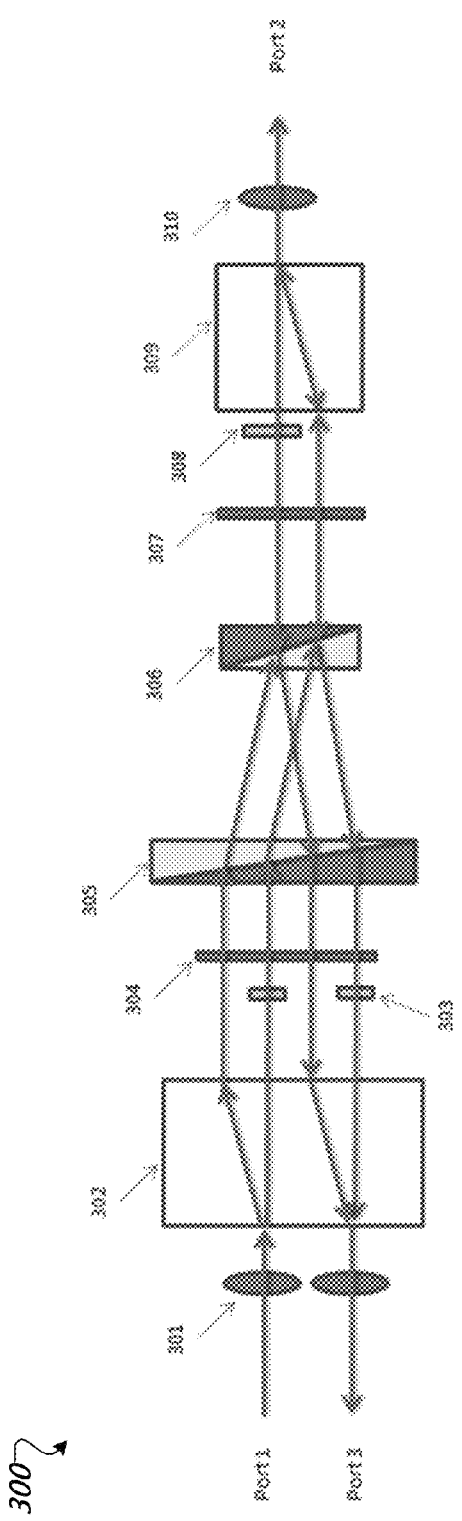
FIG. 3A is a diagram of an example circulator array on a port beam routing and polarization conditioning Y-Z plane.
Figure 3B:
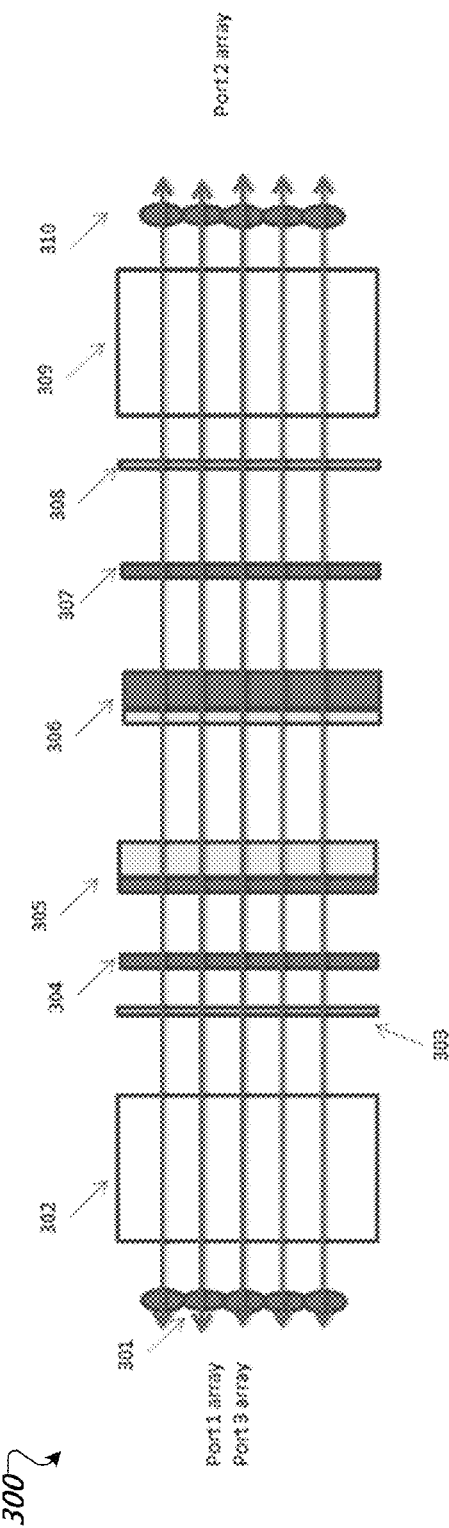
FIG. 3B is a diagram of the example circulator array of FIG. 3A on an array stacking X-Z plane.

FIG. 3A is a diagram of an example circulator array 300 on a port beam routing Y-Z plane. FIG. 3B is a diagram of the example circulator array 300 of FIG. 3A on an array stacking X-Z plane.

The optical circulator array 300 includes a first and third port array and a second port array. In particular, the first and third port array includes TEC fibers and a micro-lens array 301. The second port array includes TEC fibers and a micro lens array 310. The optical circulator array 300 is configured such that an input beam from an optical fiber at the first port array is routed to an output optical fiber at the second port array and that an input beam from an optical fiber at the second port array is routed to an output optical fiber at the third port array.

Referring to FIG. 3A, a light beam input at the first port of the first and third port array through a corresponding TEC fiber has a random polarization. The input beam is collimated by a lens of the micro lens array 301 and directed through a first Y-Z plane walk-off crystal 302. The first walk-off crystal 302 separates the incoming light beam into two beams having orthogonal polarizations. One of the two orthogonally polarized light beams, which is initially polarized parallel to X-Z plane will pass through a first 45 degree cut half wave plate 303 and its polarization will be rotated by 90 degrees to the direction that is perpendicular to X-Z plane. The light beam will then pass through a propagation direction dependent polarization rotator component, a first Faraday rotator 304. For light beams propagating in the direction from the first port array to the second port array, the propagation direction dependent polarization rotation assembly 304 provides 45 degree polarization rotation.

The other polarized light component, which is initially polarized perpendicular to X-Z plane, will be directly passed to the first Faraday rotator 304.

After the first Faraday rotator 304, the polarization direction of both light beams will be rotated by 45 degrees. However, due to the rotation by the first half wave plate 303 of one of the light beams, both light beams will share the same polarization orientation when they reach a first Y-Z plane birefringence wedge pair 305, which may be a Wollaston prism.

The first birefringence wedge pair 305 includes two crystal wedges having orthogonal crystal axes to each other. A C-axis of a first wedge of the birefringence wedge pair 305 is at a 45 degree angle with respect to the X-Z plane and the Y-Z plane. The C-axis of a second wedge of the first birefringence wedge pair 305 is at a −45 degree angle with respect to X-Z plane and Y-Z plane. The first birefringence wedge pair 305 is used to separate the beam paths for from the first port to the second port array 310 and from the second port array 310 to the third port.

Additionally, a second birefringence wedge pair 306 positioned following the first birefringence wedge pair 305 in the propagation direction from the first port to the second port array 310. The second birefringence wedge pair 306 is used to correct the parallelism of the beam paths.

Upon exiting the first birefringence wedge pair 305 and the second birefringence wedge pair 306, the two light beams are parallel to the Z-axis and are passed to a second Faraday rotator 307.

The second Faraday rotator 307 rotates the polarization of both light beams by 45 degrees such that the polarization direction of both light beams is parallel to the Y-Z plane. The light beam that was sent to the first birefringence wedge pair 305 from the first port without passing through the first half wave plate 303 passes through a second 45 degree cut half wave plate 308 and its polarization will rotated by 90 degrees to the direction that perpendicular to Y-Z plane. The two light beams then pass through a second walk-off crystal 309 where they are combined into a single light beam that is coupled to a lens 310 which focuses the light beam on an output TEC fiber of the second port array.

In the propagation direction from the second port array to the third port array, a light beam is input from a TEC fiber of the second port array and is collimated by a lens of micro lens array 310. The light beam is then separated into two orthogonally polarized beams by the second walk-off crystal 309. The light beam that is perpendicular to Y-Z plane is rotated 90 degrees by the second 45 degree cut half wave plate 308 and is sent to the second Faraday rotator 307. The light beam with a polarization direction that is parallel to Y-Z plane is sent directly to the second Faraday rotator 307.

The Faraday rotator is non-reciprocal and following the second Faraday rotator 307 the two light beams will have a polarization direction that is orthogonal to the polarization direction of the light beam at this point of the optical circulator array 300 in the opposite propagation direction from the first port array to the second port array. As a result, the first and second birefringence wedge pairs 305 and 306 will direct the light beams along a beam path toward the third port array. The two light beams are then directed through the first Faraday rotator 304 and their polarization direction are rotated 45 degrees. A first light beam is rotated by 90 degrees by the first 45 degree cut half wave plate 303 and is then combined with the other light beam in the first walk-off crystal 302. The combined light beam exiting the first walk-off crystal 302 is focused by a lens of the micro lens array 301 to a particular TEC fiber at the third port array.

FIG. 3B shows an array of three port optical circulators stacked on the X-Z plane. The first port and the third port are a dual row configuration on the Y-Z plane. The first dual row TEC fiber array is located at the front of a first dual row lens array 301. The second port is a single row configuration on Y-Z plane and the second single row TEC fiber array is located at a rear of the second single row lens array 310. The different optical circulator arrays each share the same polarization rotation assembly described above.

In particular, as shown in FIG. 3A, all optical pasts are in the Y-Z plane for each three port circulator. As shown in FIG. 3B, each of the light beams from the first port array of TEC fibers are guided to the TEC fibers of the second port array and the light beams from the second port array of TEC fibers will be guided to the TEC fibers of the third port array. The plane includes an optical path from a first port to a second port and an optical path from the second port to a third port for a given three port circulator. Each plane is parallel to other optical path planes of other three port circulator of the array.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An optical circulator array comprising:
   a plurality of stacked three port circulators each having a respective first port of a first port array, a respective second port of a second port array, and a respective third port of a third port array, wherein each of the plurality of stacked three port circulators share optical components including:
   a first Wollaston prism coupled to the first port array,
   a first lens,
   a first half wave plate,
   a polarization dependent beam path separator,
   a second half wave plate,
   a second lens,
   a propagation direction dependent polarization rotation assembly,
   a second Wollaston prism coupled to the second port array,
   a third Wollaston prism coupled to the third port array,
   a second propagation direction dependent polarization rotation assembly coupled to the first port; and
   a third propagation direction dependent polarization rotation assembly coupled to the third port.

2. The optical circulator array of claim 1, wherein the propagation direction dependent polarization rotation assembly includes a Faraday rotator and a half wave plate.

3. The optical circulator array of claim 1, wherein each port array includes one or more thermal expansion core (TEC) fibers.

4. The optical circulator array of claim 1, wherein the polarization dependent beam path separator comprises a birefringence wedge pair.

5. The optical circulator array of claim 4, wherein the birefringence wedge pair comprises:
   a first wedge optically coupled to a first side of the birefringence wedge pair; and
   a second wedge optically coupled to a second side of the birefringence wedge pair,
   wherein the first wedge and the second wedge correct parallelization of light beams passing through the optical circulator array.

6. The optical circulator array of claim 1, wherein the polarization dependent beam path separator comprises an optical beam separator with polarization dependent coating.

7. The optical circulator array of claim 3, wherein the TEC fibers, first lens, second lens, and polarization dependent beam path separator are positioned in a double telemetric configuration layout.

8. The optical circulator array of claim 1, wherein the polarization dependent beam path separator provides beam path routing from the first port to the second port and from the second port to the third port based on a polarization orientation of incident light beams.

9. The optical circulator array of claim 1, wherein the polarization dependent beam path separator is optically coupled between the first lens and the second lens.

10. The optical circulator array of claim 1, wherein the propagation direction dependent polarization rotation assembly is optically coupled between the second Wollaston prism and the second lens.

11. The optical circulator array of claim 1, wherein the second propagation direction dependent polarization rotation assembly provides isolation to reduce light leakage along a path from the second port to the first port.

12. The optical circulator array of claim 1, wherein the third propagation direction dependent polarization rotation assembly provides isolation to reduce light leakage along a path from the third port to the second port.

13. The optical circulator of claim 1, wherein light beams input at the first port are randomly polarized and wherein the first Wollaston prism and the first half wave plate provide polarization conditioning.

14. The optical circulator of claim 1, wherein the second propagation direction dependent polarization rotation assembly is optically coupled between the first Wollaston prism and the first lens, and the third propagation direction dependent polarization rotation assembly is optically coupled between the third Wollaston prism and the first lens.

15. The optical circulator array of claim 1, wherein:
   the first Wollaston prism includes a pair of wedge prisms having optic axes that are perpendicular to each other such that the light beam exiting the Wollaston prism diverges based on polarization direction such that two orthogonally polarized light beams result; and the first half wave plate is disposed to rotate one of the two orthogonally polarized light beams; and the second half wave plate is disposed to rotate one of the other of the two orthogonally polarized light beams.

\* \* \* \* \*